United States Patent
Hsu et al.

(10) Patent No.: US 8,941,980 B2
(45) Date of Patent: Jan. 27, 2015

(54) ELECTRONIC DEVICE ASSEMBLY

(75) Inventors: Po-Yen Hsu, New Taipei (TW);
Shih-Wei Chao, New Taipei (TW);
Yu-Lang Chang, New Taipei (TW);
Lee-Hui Kuo, New Taipei (TW)

(73) Assignee: ScienBiziP Consulting(Shenzhen)Co., Ltd., Guangdong (CN)

( * ) Notice: Subject to any disclaimer, the term of this patent is extended or adjusted under 35 U.S.C. 154(b) by 475 days.

(21) Appl. No.: 13/315,439

(22) Filed: Dec. 9, 2011

(65) Prior Publication Data

US 2012/0262897 A1    Oct. 18, 2012

(30) Foreign Application Priority Data

Apr. 18, 2011    (TW) .............................. 100113438 A

(51) Int. Cl.
| | | |
|---|---|---|
| H05K 5/00 | (2006.01) | |
| H05K 7/00 | (2006.01) | |
| A47G 1/10 | (2006.01) | |
| G06F 1/16 | (2006.01) | |
| H04M 1/02 | (2006.01) | |
| H04M 1/04 | (2006.01) | |

(52) U.S. Cl.
CPC ........... *G06F 1/1616* (2013.01); *H04M 1/0216* (2013.01); *G06F 1/1643* (2013.01); *H04M 1/0247* (2013.01); *H04M 1/04* (2013.01)
USPC ............ 361/679.21; 361/679.09; 361/679.27; 361/679.29; 361/679.44; 248/316.5; 248/292.14; 248/229.22

(58) Field of Classification Search
USPC ............................ 361/679.3, 679.55–679.59, 361/679.01–679.09, 679.1–679.19, 361/679.21–679.29, 679.31–679.45, 361/679.55–679.6, 724–747; 455/575.1, 455/575.3, 575.4, 575.8; 248/80–88, 248/155.1–155.5, 166–173, 180.1–186.2, 248/229.1–231.51, 271.4, 292.14, 248/316.1–316.8; 292/1–62, 113, 292/169.11–169.23, 341.11–341.19
See application file for complete search history.

(56) References Cited

U.S. PATENT DOCUMENTS

| | | | |
|---|---|---|---|
| 7,511,950 B1 * | 3/2009 | Brekke et al. ............ | 361/679.55 |
| 2007/0062089 A1 * | 3/2007 | Homer et al. .................. | 40/754 |
| 2012/0218699 A1 * | 8/2012 | Leung et al. ............. | 361/679.08 |

* cited by examiner

*Primary Examiner* — Jerry Wu
(74) *Attorney, Agent, or Firm* — Novak Druce Connolly Bove + Quigg LLP

(57) ABSTRACT

An electronic device assembly includes an electronic device, a rotatable member rotatably attached to the electronic device about a first shaft, and a peripheral device rotatably attached to the rotatable member about a second shaft. The rotatable member and the peripheral device are located on a front side of the electronic device. The peripheral device is rotatable about the second shaft relative to the rotatable member, for allowing the rotatable member and the peripheral device to be located on a same plane. The rotatable member is rotatable about the first shaft relative to the electronic device, for allowing the rotatable member and the peripheral device to be cooperatively attached to a back side of the electronic device.

20 Claims, 5 Drawing Sheets

ELECTRONIC DEVICE ASSEMBLY

BACKGROUND

1. Technical Field

The present disclosure relates to electronic devices, more particularly to, an electronic device with a peripheral device.

2. Description of Related Art

An electronic device, such as a flat computer, a mobile phone, or a PDA, often has a touch screen for operating the mobile electronic device. Sometimes, the electronic device needs to be electronically connected to a peripheral device, for example, a keyboard, for operation. The peripheral device is often secured to two sides of the mobile electronic device by slide-rails. However, the slide-rails can only support the peripheral device in an immovable position, and the angle, between the peripheral device and the mobile electronic device, cannot be adjusted.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
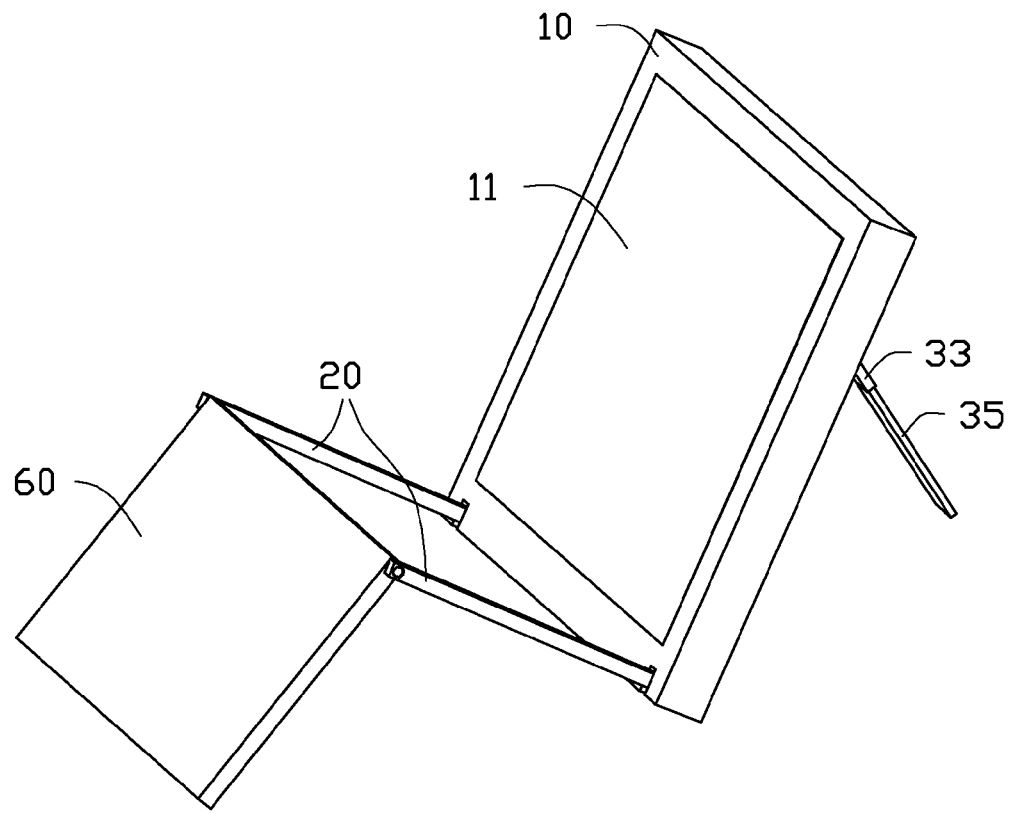
FIG. 1 is an isometric view of an electronic device assembly in accordance with an embodiment.
Figure 2:
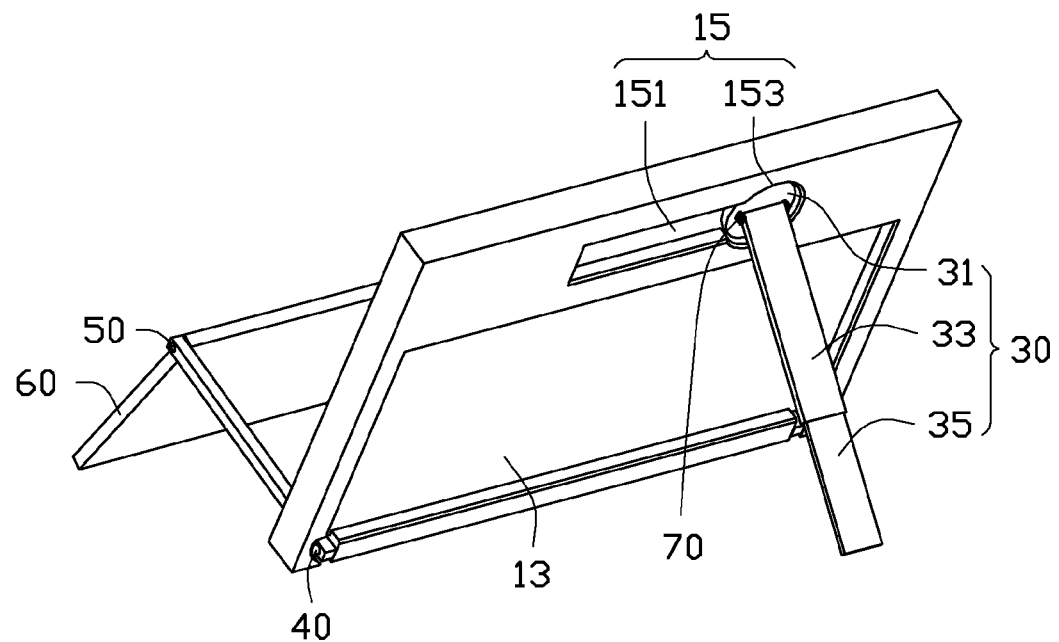
FIG. 2 is similar to FIG. 1, but viewed in a different aspect.

Referring to FIGS. 1 and 2, an electronic device assembly, in accordance with an embodiment, includes an electronic device 10, two rotatable members 20, a supporting member 30 and a peripheral device 60. The two rotatable members 20 and the supporting member 30 are attached to the electronic device 10. In one embodiment, the electronic device 10 may be a flat computer, a mobile phone, or a PDA, and the peripheral device 60 is a keyboard.

The electronic device 10 includes a receiving portion 13 and a securing portion 15. The receiving portion 13 is adjacent the securing portion 15. The securing portion 15 includes a positioning slot 151 and a pivoting hole 153 communicating with the positioning slot 151. In one embodiment, the positioning slot 151 is rectangular, and the pivoting hole 153 is circular with a diameter greater than a width of the positioning slot 151.

A first end of each rotatable member 20 is rotatably attached to the electronic device 10, and a second end of each rotatable member 20 is rotatably attached to the peripheral device 60. In one embodiment, a first shaft 40 fixes the first end of each rotatable member 20 to the electronic device 10, and a second shaft 50 fixes the second end of each rotatable member 20 to the peripheral device 60.

The supporting member 30 includes a pivoting portion 31, a first supporting post 33, and a second supporting post 35 slidably received in the first supporting post 31. In one embodiment, the supporting member 30 may be a sliding-rail, and the second supporting post 35 can be slid to any position relative to the first supporting post 31. The first supporting post 33 is rotatably attached to the pivoting portion 31 by a second shaft 70. In one embodiment, a length of the first supporting post 33 is shorter than that of the positioning slot 151.

Figure 3:
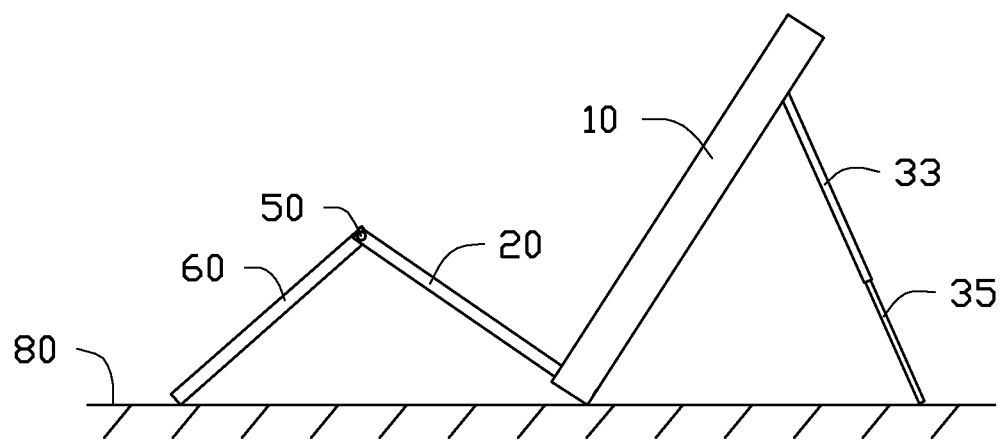
FIG. 3 is a side view of the electronic device assembly of FIG. 2.

The two rotatable members 20 are rotatable about the first shaft 40 and the peripheral device 60 is rotatable about the second shaft 50, so that the two rotatable members 20 and the peripheral device 60 can be positioned between an opened position (shown in FIG. 3) or a closed position (shown in FIG. 3). When the two rotatable members 20 and the peripheral device 60 are located in the opened position, the two rotatable members 20 are disengaged from the receiving portion, and the peripheral device 60 is supported on a supporting surface 80. When the two rotatable members 20 and the peripheral device 60 are located in the closed position, the two rotatable members 20 and the peripheral device 60 are received together in the receiving portion 13. In one embodiment, the first shaft 40 is substantially parallel to the second shaft 50 and the third shaft 70.

Figure 5:
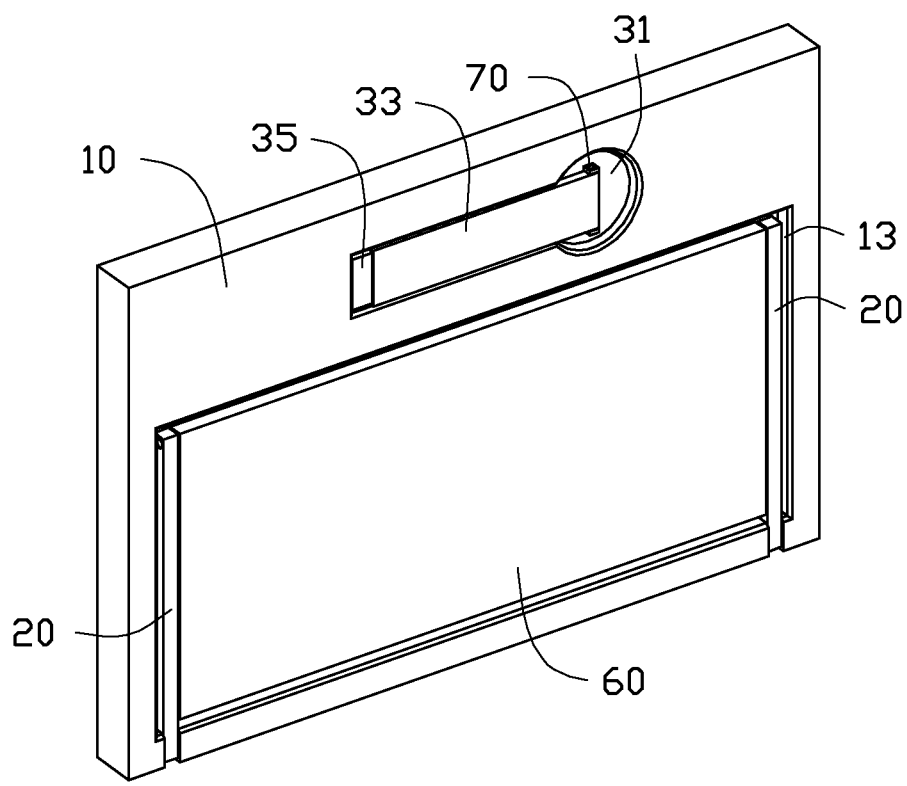
FIG. 5 is similar to FIG. 2, but shows the electronic device assembly in a closed position.

The first supporting post 31 can be rotatable about the third shaft 70 and an pivoting axis substantially perpendicular to the pivoting portion 31, and positioned in a first position (shown in FIG. 3) and a second position (shown in FIG. 5). When the supporting member 30 is in the first position, the supporting member 30 is disengaged from the securing portion 15 and supported on the supporting surface 80. When the supporting member 30 is in the second position, the supporting member 30 is received in the securing portion 15. In one embodiment, the pivoting axis is substantially perpendicular to the third shaft 70.

In use, the two rotatable members 20 are located on the opening position, and the supporting member 30 is located in the first position. The second supporting post 35 is slid out of the first supporting post 33 to be supported on the supporting surface 80. The two rotatable members 20 are rotated about the first shaft 40 relative to the electronic device 60, and an acute angle is defined between each rotatable member 20 and the electronic device 60. The peripheral device 60 is rotated about the second shaft 50 relative to the two rotatable members 20, and an obtuse angle is defined between the peripheral device 60 and each rotatable member 20. Therefore, the peripheral device 60 and the two rotatable members 20 are located on the front side of the electronic device 10, and the supporting member 30 is located on the back side of the electronic device. The peripheral device 60 is electronically connected to the electronic device 10 by connecting cables (not shown), for easy operation of the electronic device 10.

Figure 4:
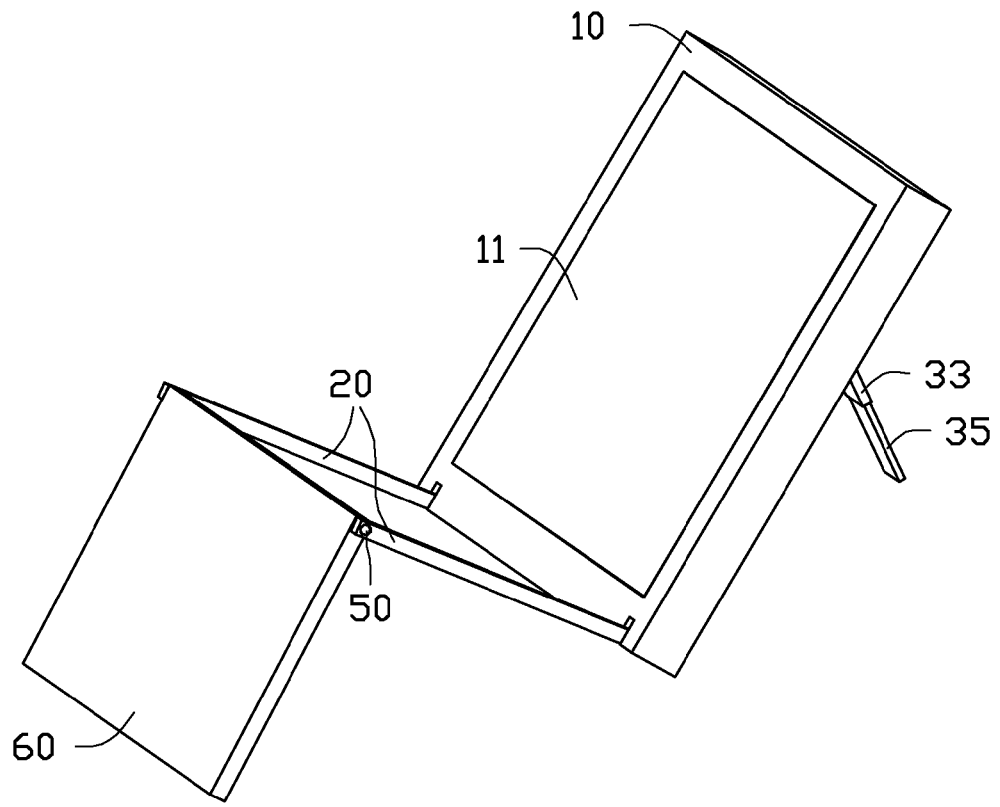
FIG. 4 is similar to FIG. 1, but shows the electronic device assembly in a different position.

Referring to FIG. 4, when an angle between the peripheral device 60 and the electronic device 10 is adjusted, the two rotatable members 20 are rotated about the first shaft 10, and the peripheral device 60 is rotated about the second shaft 20. Therefore, the angle between the peripheral device 60 and the electronic device 10 can be adjusted.

When the viewing angle of the electronic device 10 needs to be adjusted, the second supporting post 35 is slid relative to the first supporting post 33 into the first supporting post 33 or out of the first supporting post 33. The first supporting post 33 is rotated about the third shaft 70 to increase or decrease an angle between the electronic device 10 and the two rotatable members 20.

When the peripheral device 60 is not needed, the peripheral device 60 is rotated about the second shaft 50 relative to the rotatable members 20 until the peripheral device 60 and the rotatable members 20 are located on a same plane. The peripheral device 60 and the rotatable members 20 are rotated together about the first shaft 40 relative to the electronic device 10 until the peripheral device 60 and the rotatable members 20 are cooperatively received in the receiving portion 13.

When the supporting member 30 is not needed, the second supporting post 35 is slid into the first supporting post 33. The first supporting post 33 is rotated about the third shaft 30. The pivoting portion 31 is rotated about the pivoting axis until the first supporting post 33 is received in the positioning slot 151. Therefore, the supporting member 30, the peripheral device 60 and the two rotatable members 20 are located together on the back side of the electronic device 10. In one embodiment, the third shaft 70 is substantially perpendicular to the pivoting axis.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. An electronic device assembly comprising:
    an electronic device comprising a receiving portion located on a side of the electronic device opposed to a display;
    two rotatable members attached to opposite ends of a bottom portion of the electronic device; the two rotatable members being substantially parallel to each other; a peripheral device attached to the two rotatable members;
    a first shaft fixing a first end of each rotatable member to the electronic device;
    and a second shaft substantially parallel to the first shaft and fixing a second end of each rotatable member to the peripheral device; wherein the two rotatable members are rotatable relative to the electronic device about the first shaft, the peripheral device is rotatable relative to the two rotatable members about the second shaft, so that the two rotatable members and the peripheral device are engageable and received in the receiving portion with the first shaft and the second shaft are located on opposite sides of the peripheral device, and the two rotatable members are located on the other opposite sides of the peripheral device.

2. The electronic device assembly of claim 1, further comprising a supporting member, the supporting member comprising a pivoting portion, wherein the supporting member is rotatably attached to the electronic device by the pivoting portion.

3. The electronic device assembly of claim 2, wherein the electronic device further comprises a securing portion, the securing portion comprises a pivot hole, and the pivoting portion is rotatably received in the pivot hole.

4. The electronic device assembly of claim 3, wherein the supporting member further comprises a first supporting post connected to the pivoting portion, the securing portion further comprises a positioning slot communicating with the pivoting hole, the first supporting post is rotatable relative to the electronic device about a pivoting axis between a first position and a second position, the first supporting post is detached from the positioning slot when located in the first position, and the first supporting post is received in the positioning slot when located in the second position.

5. The electronic device assembly of claim 4, further comprising a third shaft, wherein the first supporting post is rotatably attached to the pivoting portion by the third shaft, the first supporting post is rotatable about the third shaft for adjusting an angle between the first supporting post and electronic device.

6. The electronic device assembly of claim 5, wherein the third shaft is capable of being substantially parallel to the first shaft and substantially perpendicular to the pivoting axis.

7. The electronic device assembly of claim 4, wherein the supporting member further comprises a second supporting post slidably received in the first supporting post.

8. The electronic device assembly of claim 4, wherein the positioning slot is rectangular, and a length of the positioning slot is greater than that of the first supporting post.

9. The electronic device assembly of claim 1, wherein the receiving portion is located on a back side of the electronic device, the rotatable member and the peripheral device are located on a front side of the electronic device when located in an open position, and the rotatable member and the peripheral device are received in the receiving portion in a closed position.

10. An electronic device assembly comprising:
    an electronic device comprising a touch screen; a first shaft; a second shaft;
    two rotatable members attached to the electronic device, the two rotatable members being rotatable about the first shaft; and
    a peripheral device attached to the two rotatable members, the peripheral device being rotatable about the second shaft;
    wherein the two rotatable members and the peripheral device are located on a front side of the electronic device; the peripheral device is rotatable about the second shaft relative to the two rotatable members, so that two rotatable members and the peripheral device are capable of being on a same plane, and the two rotatable members are located on opposite sides of the peripheral device; and the two rotatable members are rotatable about the first shaft relative to the electronic device, so that the two rotatable members and the peripheral device are capable of attaching to a back side of the electronic device with the first shaft and the second shaft are located on the other opposite sides of the peripheral device.

11. The electronic device assembly of claim 10, wherein the first shaft is substantially parallel to the second shaft.

12. The electronic device assembly of claim 10, wherein the electronic device comprises a receiving portion adapted to receive the rotatable member and the peripheral device.

13. The electronic device assembly of claim 10, further comprising a supporting member, the supporting member comprising a pivoting portion, wherein the supporting member is rotatably attached to the electronic device by the pivoting portion.

14. The electronic device assembly of claim 13, wherein the electronic device comprises a securing portion, the securing portion comprises a pivot hole, and the pivoting portion is rotatably received in the pivot hole.

15. The electronic device assembly of claim 14, wherein the supporting member further comprises a first supporting post connected to the pivoting portion, the securing portion further comprises a positioning slot communicating with the pivoting hole, the first supporting post is received in the positioning slot, and the first supporting post is rotatable relative to the electronic device about a pivoting axis substantially perpendicular to the pivoting portion, to disengage from the positioning slot.

16. The electronic device assembly of claim 15, further comprising a third shaft, wherein the first supporting post is rotatably attached to the pivoting portion by the third shaft, and the first supporting post is rotatable about the third shaft to adjust an angle between the first supporting post and electronic device.

17. The electronic device assembly of claim 16, wherein the third shaft is capable of being substantially parallel to the first shaft and substantially perpendicular to the pivoting axis.

18. The electronic device assembly of claim 15, wherein the supporting member further comprises a second supporting post slidably received in the first supporting post.

19. The electronic device assembly of claim 14, wherein the positioning slot is rectangular, and a length of the positioning slot is greater than that of the first supporting post.

20. The electronic device assembly of claim 10, wherein a first end of each rotatable member is attached to a bottom portion of the electronic device, and a second end of each rotatable member is attached to the peripheral device.

* * * * *